Oct. 31, 1961  T. GASSINO ET AL  3,006,540
PROGRAM CONTROL DEVICE FOR ACCOUNTING MACHINES
HAVING A TRAVELING PAPER CARRIAGE
Filed April 15, 1959
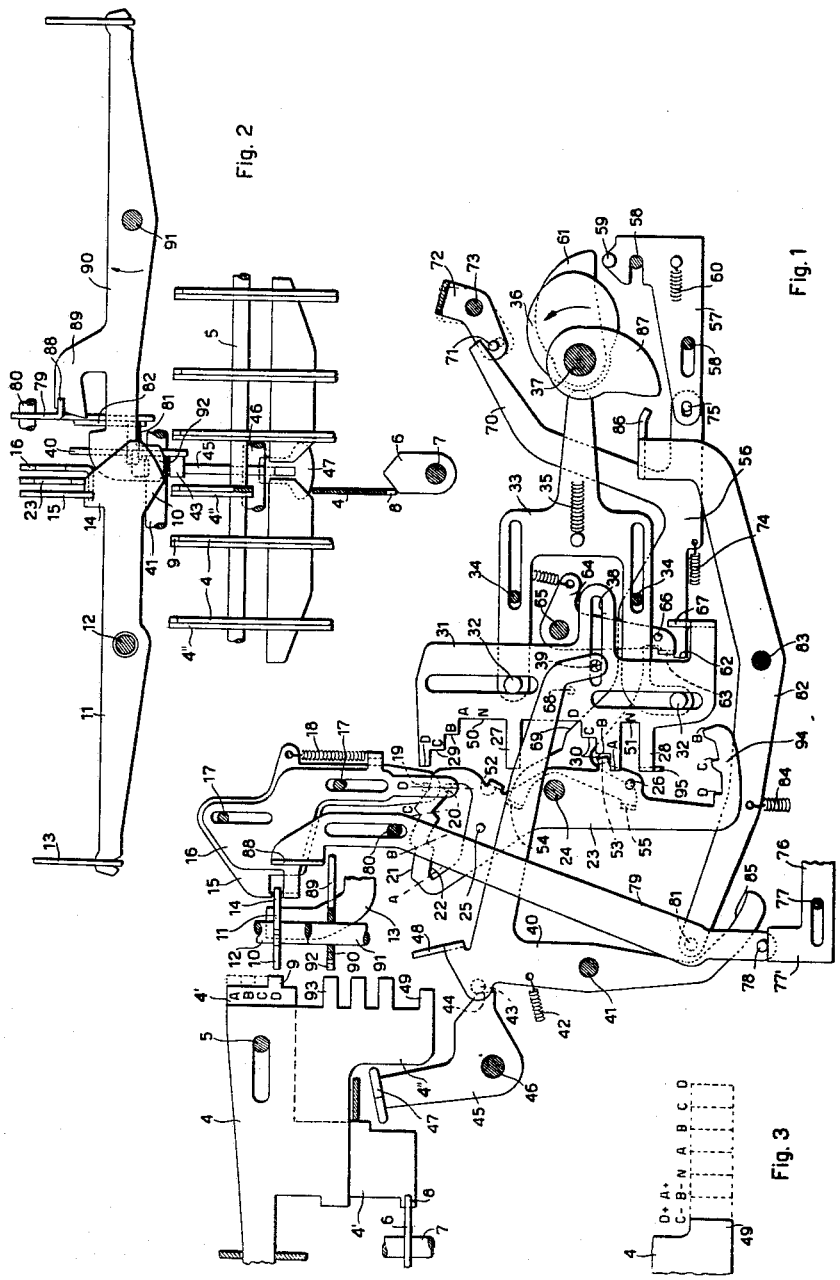
INVENTORS
TERESIO GASSINO
NATALE CAPELLARO
BY
ATTORNEYS

United States Patent Office 3,006,540
Patented Oct. 31, 1961

3,006,540
PROGRAM CONTROL DEVICE FOR ACCOUNTING MACHINES HAVING A TRAVELING PAPER CARRIAGE

Teresio Gassino and Natale Capellaro, Ivrea, Italy, assignors to Ing. C. Olivetti & C., S.p.A., Ivrea, Italy, a corporation of Italy
Filed Apr. 15, 1959, Ser. No. 806,574
Claims priority, application Italy Apr. 24, 1958
13 Claims. (Cl. 235—60.46)

The present invention relates to accounting machines having a traveling paper carriage provided with a set of column stops which are adapted to locate said carriage in predetermined columnar positions and to control various functions of the machine.

Generally the column stops are arranged according to one or a plurality of selectable accounting work programs of automatically performed machine functions. Moreover, a normal program may be altered in order to incidentally effect unusual operations and may thereupon be restored, as for example, where first a sequence of amount enterings are listed on a work sheet and then the total of said enterings should be printed on said sheet.

Where the column stops are arranged according to a plurality of programs, the normal program may be altered by having the machine controlled by the stops of another program. In such machines the operator will handle the program changing device twice, first to alter the normal program and thereupon to restore the normal program.

The primary object of the invention is to provide in an accounting machine having a traveling paper carriage a novel program control device wherein a columnar position may be automatically selected when the carriage is located on the preceding columnar position.

Another object of the invention is to provide a program control device adapted to variably select the next column stops without requiring the operator to handle the device.

According to the invention we now provide an accounting machine having a main operating mechanism, a traveling paper carriage, a set of column stops mounted on said carriage and movable bodily therewith, means mounted on a stationary support and adapted to be actuated to arrest said carriage, a lug on each column stop for actuating said arresting means upon reaching a predetermined columnar position, said lug being variably located on the various column stops of said set, and means operable by said mechanism for changing the cooperative relationship of said element and said arresting means according to a selected one of said variable locations to enable said arresting means to be actuated by a column stop having a lug in said selected location.

Further objects, features and advantages of the invention will become apparent from the following description of a preferred embodiment thereof, taken in conjunction with the accompanying drawings, wherein:

FIG. 1 is a partial left-hand longitudinal sectional view of an accounting machine having a traveling paper carriage embodying the program control device according to the invention;

FIG. 2 is a partially sectional plan view of FIG. 1;
FIG. 3 is a detail of FIG. 1 on an enlarged scale.

The general structure of the accounting machine shown in the drawings is derived, by way of example and without any limiting implication, from the machine illustrated in connection with United States Patent 2,849,179, to which reference may be had for a more detailed description thereof.

With reference to FIG. 1, the numeral 4 indicates one of a set of column stops mounted on the conventional traveling paper carriage and movable bodily therewith, as fully described in the above mentioned U.S. Patent 2,849,179 with reference to the stops 42 shown in FIG. 1 thereof. In the present embodiment the column stops are shiftable. More particularly, each column stop 4 includes a first shiftable portion 4' and a second shiftable portion 4" mounted on a shaft 5 secured to the carriage.

Means are provided for individually shifting the column stops 4. More particularly, a wedge shaped shifting arm 6 (FIG. 2) is mounted on a vertical shaft 7 for individually shifting the first portion 4' forwards (rightwards in FIG. 1) by engaging its projection 8 during the travel of the carriage.

Mounted on a stationary support such as a shaft 12 is an arresting means including a pivoted lever 11 adapted to be actuated to arrest the travel of the carriage.

A lug is provided on each column stop for actuating said arresting means upon reaching a predetermined columnar position. More particularly, the first portion 4' is provided with a forward projection 9 for actuating said arresting means upon shifting said first portion 4', said projection 9 being variably located on the first portion of the various column stops 4 of the set of column stops in one or more of four vertical locations shown by broken lines in FIG. 1, said locations being hereinafter called A, B, C and D locations from top to bottom.

When the portion 4' is shifted forwards by the shifting arm 6 the projection 9 engages a sloped end 10 of the lever 11 and rocks the latter counterclockwise (FIG. 2), whereby a slide 13 connected to the lever 11 will be moved rearwards to arrest the carriage.

The lever 11 is pivoted on the shaft 12 with a clearance enabling the lever 11 to be rocked about an imaginary longitudinal axis perpendicular to the shaft 12 in order to change the cooperative relationship of the projection 9 and the lever 11 according to a selectable one of the four vertical locations A, B, C, D to enable the lever 11 to be engaged by a column stop having a projection 9 in said selected location. To this purpose the end 10 of the lever 11 may be moved to a position corresponding to said selected location by moving means comprising a pair of slides 15 and 16 vertically slidable on two stationary pins 17 and engaging a projection 14 of the lever 11. The slides 15 and 16 are mutually connected by a spring 18 and are provided with two pins 19 and 20, respectively adapted to ride over two opposed notched edges 21 and 22 of a rocking member 23. Upon being rocked in the manner hereinafter described, the member 23 vertically moves the slides 15 and 16 thus enabling them to assume in the cooperative relationship with said notched edges four different positions called A, B, C and D as well.

Upon rocking the member 23 about its shart 24 the pair of slides 15 and 16 will move the end 10 of the lever 11 upwards to a position depending upon the angular displacement of the member 23 which in turn is kept in its new position by the two pins 19 and 20.

The rocking member 23 is provided with a pair of opposed elements or pins 25 and 26 adapted to cooperate either with a pair of shoulders 27 and 28 or with a pair of stepped edges 29 and 30 of an operating member formed of a plate 31 vertically slidable on two pins 32 of a slide 33. This slide is in turn horizontally slidable on two stationary pins 34 and is urged by a spring 35 to contact a cam 36 of a main shaft 37 included in the conventional main operating mechanism of the machine and adapted to be cyclically driven by power means, such as an electric motor not shown in the drawings.

The plate 31 is formed with a horizontal slot 38 engaged by a pin 39 of a lever 40 pivoted at 41. The lever 40 is formed with an upper bent lug 48 engageable by a suitable shifting element such as the forward edge of a projection 49 provided on the second portion 4" of the stop 4. Said element may be differentially located on the second portion 4" of the various column stops of the set of column stops, that is, the projection 49 may be of seven different lengths diagrammatically shown in FIG. 3. More particularly, said projections comprise a normal projection N, four long projections A, B, C and D longer than the normal projection N and corresponding to the four locations of the projection 9, and two short projections AB and DC, respectively shorter than the normal projection N. The projection 49 shown in FIG. 1 is a normal projection N.

By the urge of a spring 42 a pin 43 of the lever 40 normally contacts a locking means such as an abutment 44 provided on an actuator formed of a lever 45 pivoted at 46. Secured to the lever 45 is a shifting lug 47 adapted to individually cooperate with the second portion 4" of the column stop 4.

Before the beginning of a machine cycle the lever 45 may be rotated clockwise by conventional power means included in the machine but not shown in the drawings, in the manner described in the cited Patent 2,849,179, with reference to the bail 79 shown in FIG. 1 thereof, under the control either of a suitable tabulating key or of the first portion 4' of the stop 4 upon being shifted by the arm 6. As fully disclosed in said patent, the lever 45 when so rotated will start the main shaft 37 for a machine cycle and will cause its lug 47 to shift the portion 4" forwards in order to set the various machine functions as conditioned by the projections carried by said portion, whereby the machine cycle is automatically controlled by the column stop 4 of the actual columnar position of the carriage. Furthermore, the lever 45 releases the pin 43 from the abutment 44, thus enabling the projection 49 to engage the lug 48 against the urge of the spring 42.

If the projection 49 is a normal projection N as in FIG. 1, upon being shifted forwards with the portion 4" it contacts the lug 48 without rotating the lever 40 clockwise, whereby the plate 31 remains in the position of FIG. 1. During the machine cycle started by the lever 45, the cam 36 through the slide 33 will shift the plate 31 rearwards. Since two recesses 50 and 51 of the plate 31 are now located in front of the pins 25 and 26 of the rocking member 23, the rearward movement of the plate 31 does not affect the angular position of the rocking member 23 and, consequently, the vertical position of the lever 11. The next following tabulating stroke of the carriage will thus be arrested by a column stop 4 having a projection 9 in the same location as the actual position of the lever 11. If the lever 45 has been rotated by the first portion 4' the carriage will, therefore, be arrested by a column stop 4 having a projection 9 in the same location as the location of the projection 9 of said first portion.

If the projection 49 is one of the four long projections A, B, C, D, upon being shifted forwards with the portion 4" it will rock the lever 40 which in turn will depress the plate 31. The latter is thus set in a position corresponding to the length of the projection 49 and enables the corresponding step of the two stepped edges 29 and 30 to be located in front of the pins 25 and 26, respectively. When during the machine cycle the plate 31 is shifted rearwards by the cam 36, either the stepped edge 29 or the stepped edge 30, depending upon the actual position of the rocking member 23, will rock the latter to an angular position corresponding to the vertical position of the plate 31 and, consequently, to the length of the projection 49 rocking the lever 40. The rocking member 23 moves now the slides 15 and 16 which will set the end 10 of the lever 11 in front of a corresponding location A to D of the projection 9, irrespective of the initial position of the rocking member 23.

More particularly, a long projection 49-A will depress the plate 31 one step, thus setting the step A of the edges 29 and 30 in front of the pins 26, 25, respectively. The plate 31 will now rock the member 23 through its maximum angle, thus locating the pins 19 and 20 in the notches A of the two edges 21 and 22, respectively. The pins 19 and 20 are thus lifted and the slides 15 and 16 locate the end 10 of the lever 11 in a position corresponding to the location A of the projection 9. Similarly, a long projection 49-B, 49-C, or 49-D causes the member 23 to be rocked a corresponding minor angle to locate the end 10 in front of the corresponding location B, C, D, respectively, of the projection 9. In each case the plate 31 will engage either the pin 26 or the pin 25 and rock the member 23 either clockwise or counterclockwise, respectively, to its angular position corresponding to the length of the projection 49, according to the initial position of the member 23.

It will thus be apparent that the arresting means 11 adapted to be actuated by the projection 9 to arrest the carriage may be moved to a selected position by the power means of the machine under the control of a column stop 4 adapted to variably set the operating member 31.

It will further be apparent that such a mode of operation will increase the degree of selectivity of the columnar positions of the carriage. Indeed a column stop having the projection 9 in a predetermined location may select the next column stop having a projection 9 in a predetermined one of the four locations.

The locations A to D of the projection 9 may be divided into two different groups, a first group comprising the locations A and B, a second group comprising the locations C and D. According to a feature of the invention the end 10 of the lever 11 may be first shifted to select one of said groups, the final location of the selected group being then selected by additionally shifting the lever 11 according to the character of the amount stored in the register of the machine.

To this end the rocking member 23 is provided with a pair of bent lugs 52 and 53 engageable by two bent lugs 54 and 55, respectively, of an auxiliary operating member formed of a forked lever 56. This lever is pin and slot connected to a slide 57 horizontally slidable on two stationary pins 58. A cam 61 secured to the main shaft 37 may engage a pin 59 after the cam 36 has shifted the slide 33 rearwards to shift the slide 57 forwards against the urge of a spring 60.

The lever 56 is formed with a shoulder 62 normally locked at rest under a lug 63 of a hook shaped lever 64 pivoted at 65. Secured to the hook shaped lever 64 is a pin 66 adapted to cooperate with a bent lug 67 of the plate 31. A pin 68 secured to the plate 31 is adapted to cooperate with the upper edge of the lever 56. An arm 70 of the lever 56 is adapted in turn to cooperate with a pin 71 of a bail 72 pivoted at 73. The bail 72 is the conventional means indicating the character of the amount stored in the register of the machine and will assume the position shown by full lines in FIG. 1 if a positive amount is stored, whereas it will assume the position shown by broken lines if a negative amount is stored.

It will now be assumed that the projection 49 is one of the short projections. When the stop portion 4" is shifted forwards by the lever 45, the projection 49 is unable of rocking the lever 40 clockwise but in turn it is sensed by the lug 48 of the lever 40 rocked counterclockwise by the spring 42, whereby the pin 39 raises the plate 31 to set same in one of two set positions corresponding to the two groups of locations of the projection 9. More particularly, if the projection 49 is a projection AB (FIG. 3) the plate 31 (FIG. 1) is raised one step to set the shoulder 28 in front of the pin 26 of the rocking member 23 and the lug 67 in front of the pin 66 of the hook shaped lever 64. During the first half of the machine cycle the plate 31 is shifted rearwards by the cam 36 whereby its shoulder 28 will rock the member 23 to the position A. Furthermore, the lug 67 of the plate 31 engages the pin 66 and rocks the hook shaped lever 64 clockwise, enabling the lug 63 to release the shoulder 62 of the lever 56. By the urge of the spring 74 the arm 70 of the lever 56 will now sense the pin 71 of the bail 72.

If the bail 72 is in the position shown in FIG. 1, indicating a positive amount is stored in the register, the lever 56 is substantially prevented from being rocked and the lugs 54 and 55 do not engage the lugs 52 and 53, respectively, of the rocking member 23. About the end of the machine cycle the cam 61 will shift the slide 57 and the lever 56 forwards, however, without affecting the rocking member 23 which remains in the position A.

If, on the contrary, the bail 72 is in the position shown by broken lines in FIG. 1, indicating a negative amount is stored in the register, the lever 56 upon sensing the pin 71 will rock about the pin 75 and locate the lugs 54 and 55 in front of the lugs 52 and 53, respectively, of the rocking member 23. When the lever 56 is then shifted forwards by the cam 61 its lug 55 will engage the lug 53 and rock the member 23 from the position A to the position B.

Similarly, if the projection 49 is a projection DC (FIG. 3) the plate 31 is raised two steps to set the shoulder 27 in front of the pin 25 and the lug 67 in front of the pin 66. In this case the rocking member 23 is first rocked to the position D by the plate 31. Thereupon if a positive amount is stored in the register the member 23 remains in the position D, if a negative amount is stored in the register the member 23 will be rocked by the lug 54 from the position D to the position C.

It will thus be apparent that upon rocking the lever 40 counterclockwise, first the operating member 31 will select one of the two groups of locations and thereafter the auxiliary operating member 56 will select the final location of the selected group.

The lever 56 will be restored to the locked position of FIG. 1 during the next machine cycle by the pin 68 which will engage the edge 69 and depress the lever 56, thus enabling the lug 63 to lock the shoulder 62.

Hereinabove it has been described how a column stop will select the next column stop which will arrest the carriage travel. However, such a selection is rigidly predetermined and the selected stops will merely control the normal program of the accounting work. If it is desired to alter said normal program the operator should operate suitable manipulative means which will now be described.

Said manipulative means comprise a slide 76 horizontally slidable on a pin 77, for example by the action of a program altering key of the keyboard, not shown in the drawings. The slide 76 is provided with a projection 77' normally locking a pin 78 of a program control means such as a vertical slide 79 slidably mounted on a stationary stud 80 and linked by means of a pin 81 to one end of a lever 82. The pin 81 is extended leftwards (FIG. 2) to cooperate with a cam edge 85 (FIG. 1) of the lever 40. The lever 82 is pivoted at 83 and is provided with a bent lug 86 engageable by a cam 87 of the main shaft 37.

The slide 79 is provided with an upper bent lug 88 adapted to cooperate with a projection 89 (FIG. 2) of a lever 90 fulcrumed on a vertical pivot 91. Each second portion 4" of the column stops 4 may be provided with a projection 93 adapted to cooperate with one end 92 of the lever 90. Finally, the rocking member 23 is formed with a toothed arm 94 adapted to cooperate with an elementar lug 95 bent over the shoulder 28 of the plate 31.

It will now be assumed that the rocking member 23 is located in the position D as shown in FIG. 1 and that the normal accounting work program should be altered when the carriage is arrested on a column stop 4 having the projection 93. To this end the operator depresses the program altering key whereby the slide 76 is shifted forwards. The projection 77' of the slide 76 releases now the pin 78 and the spring 84 rocks the lever 82 counterclockwise, which lever, however is immediately arrested by the projection 89 of the lever 90.

When the second portion 4" is moved forwards, the projection 93 rocks the lever 90 clockwise (FIG. 2), causing the projection 89 to release the lug 88 and enabling the slide 79 (FIG. 1) to be lowered. The pin 81 will thus rock the lever 40 clockwise, whereby the plate 31 will be lowered through an extent longer than the extent caused by the longest projection 49. Therefore, the lug 95 will be set into a cooperative relationship with the tooth D of arm 94 of the member 23. When thereupon the plate 31 is moved rearwards by the cam 36, the lug 95 will rock the member 23 one step from the position D to the position C. At the end of the machine cycle the cam 87 through the lever 82 will restore the slide 79 upwards, thus enabling the slide 76 to be restored by means not shown in the drawings.

Similarly, if the member 23 is in the position C and the program altering key is depressed, the lug 95 of the plate 31 engages the tooth C of the arm 94 and rocks the member 23 to the position B. Finally, if the member 23 is in the position B the lug 95 engages the tooth B and rocks the member 23 to the position A. It will thus be apparent that the program altering key will cause the end 10 of the lever 11 to be shifted from its actual position to the next higher position from D to A.

It will be understood that unless followed by the forward movement of the second portion 4" and by the action of the projection 93 the depression of the program altering key does not cause the program control means to be operated, thus preventing an accidental key action from altering the program in an undue columnar position.

It will be apparent that upon having manually altered the normal accounting program, the lever 11 may be automatically restored in the position corresponding to the normal program by a column stop having a suitable projection 49 for instance, whereby a program restoring key is not required and the accounting work of the operator results simplified.

The manual alteration of the accounting program may affect several columnar positions of the carriage and may be followed by a second alteration and so on whereby a so called vertical tabulation with a great variability of carriage operations may be obtained.

It will be understood that many changes and improvements in the form and details of the mechanism illustrated may be made by those skilled in the art without departing from the spirit of the invention. For example, the column stops 4 may be mounted stationary in the carriage and the lever 11 may be rocked by the projection 9 during the travel of the carriage. Similarly, the column stops 4 may be made of a single portion which is moved through a first extent by the arm 6 and through a second extent by the power operated actuator 47, as fully disclosed in the Patent 2,849,179 cited hereinbefore.

What we claim is:

1. In an accounting machine having power means and a traveling paper carriage, a set of column stops mounted on said carriage and movable bodily therewith, means movably mounted on a stationary support and adapted to be actuated to arrest said carriage, a lug on each column stop for actuating said arresting means upon reaching a predetermined columnar position, said lug being variably located on the various column stops of said set along a given direction, the variably located lugs having all a uniform length on said column stop, a reciprocable member operable for moving said arresting means along said direction to a position corresponding to a selected one of said variable locations, an operating member variably settable in a first direction by a column stop upon having actuated said arresting means to assume a position relative to said reciprocable member corresponding to said selected location, and a power driven cam element for moving said operating member through a constant extent in a second direction to positively operate said reciprocable member.

2. In an accounting machine having power means and a traveling paper carriage, a set of column stops mounted on said carriage and movable bodily therewith, means movably mounted on a stationary support and adapted to be actuated to arrest said carriage, a lug on each column stops for operating said arresting means upon reaching a predetermined columnar position, said lug being variably located on the various column stops of said set, the variably located lugs having all a uniform length on said column stop, a rocking member operable for moving said arresting means to a position corresponding to a selected one of said variable locations, a power driven operating member for said rocking member, one of said members having a pair of opposed stepped edges, the other member having a pair of elements engageable with said pair of stepped edges, and setting means for variably setting one member with respect to the other member.

3. In an accounting machine having a power driven main operating shaft and a traveling paper carriage, a set of column stops mounted on said carriage and movable bodily therewith, means movably mounted on a stationary support and adapted to be actuated for arresting said carriage, a projection on each column stop for actuating said arresting means upon reaching a predetermined columnar position, said projection being variably located on the various column stops of said set, the variably located projections having all a uniform length on said column stop, a rocking member operable for moving said arresting means to a position corresponding to a selected one of said variable locations, an operating member for said rocking member, said operating member being variably settable in a first direction, one of said members having a pair of opposed stepped edges, the other member having a pair of elements engageable with said pair of stepped edges, an element on a column stop for setting said operating member with respect to said rocking member according to said selected location, and a cam on said main operating shaft for positively driving said operating member through a constant extent in a second direction.

4. In an accounting machine having a register and a traveling paper carriage, a set of column stops mounted on said carriage and movable bodily therewith, means movably mounted on a stationary support and adapted to be actuated for arresting said carriage, a projection on each column stop for actuating said arresting means upon reaching a predetermined columnar position, said projection being variably located in a number of groups on the various column stops of said set, each group including two variable locations, means operable for moving said arresting means to a position corresponding to a selected location of a selected group, a first variably settable operating member for operating said moving means according to a selected group, an element on each column stop for variably setting said first operating member, an auxiliary variably settable operating member for operating said moving means according to a selected location within said groups, means indicating the character of an amount stored in said register for variably setting said auxiliary operating member, and power means for driving said first and auxiliary operating members to sequentially operate said moving means.

5. In an accounting machine as defined in claim 4, locking means for normally locking said auxiliary operating member in an ineffective position, means controlled by a column stop upon reaching said columnar position for disabling said locking means, and sensing means connected to said first operating member for sensing said element to accordingly set said first operating member.

6. In an accounting machine having power means and a traveling paper carriage, a set of column stops mounted on said carriage and movable bodily therewith, means movably mounted on a stationary support and adapted to be actuated for arresting said carriage, a projection on each column stop for actuating said arresting means upon reaching a predetermined columnar position, said projection being variably located on the various column stops of said set, the variably located projections having all a uniform length on said column stop, means operable for moving said arresting means to a position corresponding to a selected one of said variable locations, a power driven member settable for operating said moving means, program control means operable for setting said member, manipulative means adapted to condition said program control means for operation, and means controlled by a column stop upon having actuated said arresting means for operating said program control means when so conditioned.

7. In an accounting machine having power means and a traveling paper carriage, a set of column stops mounted on said carriage and movable bodily therewith, means movably mounted on a stationary support and adapted to be actuated for arresting said carriage, a projection on each column stop for actuating said arresting means upon reaching a predetermined columnar position, said projection being located at one of a succession of locations on the various column stops of said set, a rocking member connected with said arresting means to move same to a position corresponding to a selected one of said succession of locations, a toothed arm on said rocking member, an operating member having an element settable in a first direction to engage said toothed arm, a cam on said power means to drive said operating member in a second direction for moving said rocking member through one step, program control means operable for setting said element, manipulative means cooperating with said program control means, and means controlled by a column stop upon having actuated said arresting means for enabling said manipulative means to operate said program control means.

8. In an accounting machine having power means and a traveling paper carriage, a set of shiftable column stops mounted on said carriage and movable bodily therewith, means for individually shifting said column stops through a first extent during travel of the carriage, a power driven actuator for individually shifting said column stops through a second extent, means movably mounted on a stationary support and adapted to be actuated to arrest said carriage, a lug on each column stop for actuating said arresting means upon shifting said column stop through said first extent, said lug being variably located on the various column stops of said set along a given direction, the variably located lugs having all a uniform length on said column stop, a reciprocable member operable for moving said arresting means along said direction to a position corresponding to a selected one of said variable locations, an operating member variably settable in a first direction by a column stop when shifted by said actuator to assume a position relative to said reciprocable member corresponding to said selected location, and a power driven cam element for moving said operating member through a constant extent in a second direction to positively operate said reciprocable member.

9. In an accounting machine having a power driven main operating shaft and a traveling paper carriage, a set of column stops mounted on said carriage and movable bodily therewith, each column stop including a first shiftable portion and a second shiftable portion, means for individually shifting said first portion during travel of the carriage, a power driven actuator for individually shifting said second portion, means movably mounted on a stationary support and adapted to be actuated for arresting said carriage, a projection on said first portion for actuating said arresting means upon shifting said first portion, said projection being variably located on the first portion of the various column stops of said set, the variably located projections having all a uniform length on said column stop, a rocking member operable for moving said arresting means to a position corresponding to a selected one of said variable locations, an operating member for said rocking member, said operating member being variably settable in a first direction, one of said members having a pair of opposed stepped edges, the other member having a pair of elements selectively engageable with said pair of stepped edges, an element on the second portion of a column stop for setting said operating member with respect to said rocking member according to said selected location, and a cam on said main operating shaft for positively driving said operating member through a constant extent in a second direction.

10. In an accounting machine having a register and a traveling paper carriage, a set of column stops mounted on said carriage and movable bodily therewith, each column stop including a first shiftable portion and a second shiftable portion, means for individually shifting said first portion during travel of the carriage, a power driven actuator for individually shifting said second portion, means movably mounted on a stationary support and adapted to be actuated for arresting said carriage, a projection on said first portion for actuating said arresting means upon shifting said first portion, said projection being variably located in a number of groups on the first portion of the various column stops of said set, each group including two variable locations, means operable for moving said arresting means to a position corresponding to a selected location of a selected group, a first variably settable operating member for operating said moving means according to a selected group, an element on the second portion of each column stop, said element being variably located on said second portion of the various column stops of said set, said last named variable locations corresponding to said groups, said element upon shifting said second portion being adapted to set said first operating member, an auxiliary variably settable operating member for operating said moving means according to a selected location within said groups, means indicating the character of an amount stored in said register for differentially setting said auxiliary operating member, and power means for driving said first and second auxiliary operating members to sequentially operate said moving means.

11. In an accounting machine as defined in claim 10, locking means for normally locking said auxiliary operating member in an ineffective position, means controlled by said actuator for disabling said locking means, and sensing means connected to said first operating member for sensing said element to accordingly set said first operating member.

12. In an accounting machine having power means and a traveling paper carriage, a set of column stops mounted on said carriage and movable bodily therewith, each column stop including a first shiftable portion and a second shiftable portion, means for individually shifting said first portion during travel of the carriage, a power driven actuator for individually shifting said second portion, means movably mounted on a stationary support and adapted to be actuated for arresting said carriage, a projection on said first portion for actuating said arresting means upon shifting said first portion, said projection being variably located on the first portion of the various column stops of said set, the variably located projections having all a uniform length on said column stop, means operable for moving said arresting means to a position corresponding to a selected one of said variable locations, a power driven member settable for operating said moving means, program control means operable for setting said member, manipulative means adapted to condition said program control means for operation, and means controlled by the second portion of a column stop upon being shifted for operating said program control means when so conditioned.

13. In an accounting machine having power means and a traveling paper carriage, a set of column stops mounted on said carriage and movable bodily therewith, each column stop including a first shiftable portion and a second shiftable portion, means for individually shifting said first portion during travel of the carriage, a power driven actuator for individually shifting said second portion, means movably mounted on a stationary support and adapted to be actuated for arresting said carriage, a projection on said first portion for actuating said arresting means upon shifting said first portion, said projection being variably located on the first portion of the various column stops of said set, a stepwise shiftable member for moving said arresting means from a position corresponding to one of said variable locations to a position corresponding to an adjacent variable location, a toothed arm on said shiftable member, an operating member settable in a first direction to engage said toothed arm, a cam on said power means to drive said operating member in a second direction for shifting said shiftable member through one step, program control means operable for setting said operating member, manipulative means adapted to condition said program control means for operation, and means controlled by the second portion of a column stop upon being shifted for operating said program control means when so conditioned.

References Cited in the file of this patent
FOREIGN PATENTS

| | | |
|---|---|---|
| 143,661 | Australia | Oct. 3, 1951 |
| 736,681 | Great Britain | Sept. 14, 1955 |
| 819,609 | Great Britain | Sept. 9, 1959 |